United States Patent
Kamikado et al.

(10) Patent No.: US 11,912,290 B2
(45) Date of Patent: Feb. 27, 2024

(54) SELF-POSITION ESTIMATION ACCURACY VERIFICATION METHOD AND SELF-POSITION ESTIMATION SYSTEM

(71) Applicant: TOYOTA JIDOSHA KABUSHIKI KAISHA, Toyota (JP)

(72) Inventors: Kazuhiko Kamikado, Susono (JP); Taichi Kawanai, Susono (JP); Sadayuki Abe, Shizuoka-ken (JP); Hideyuki Matsui, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 17/516,107

(22) Filed: Nov. 1, 2021

(65) Prior Publication Data

US 2022/0234601 A1 Jul. 28, 2022

(30) Foreign Application Priority Data

Jan. 28, 2021 (JP) ................................ 2021-012450

(51) Int. Cl.
*B60W 50/02* (2012.01)

(52) U.S. Cl.
CPC . *B60W 50/0205* (2013.01); *B60W 2050/0215* (2013.01)

(58) Field of Classification Search
CPC .................. B60W 50/0205; B60W 2050/0215
See application file for complete search history.

(56) References Cited

U.S. PATENT DOCUMENTS

| 3,554,223 | A | * | 1/1971 | Shea | F16K 17/0406 73/1.72 |
| 6,272,405 | B1 | * | 8/2001 | Kubota | G01S 19/41 701/472 |
| 8,890,746 | B2 | * | 11/2014 | Alizadeh-Shabdiz | G01S 5/0263 342/357.31 |
| 9,580,285 | B2 | * | 2/2017 | Wong | G05D 1/0274 |
| 11,313,663 | B2 | * | 4/2022 | Shimamura | G05D 1/027 |
| 11,378,979 | B2 | * | 7/2022 | Zhou | G05D 1/0278 |
| 2012/0053831 | A1 | | 3/2012 | Halder | |
| 2017/0153313 | A1 | | 6/2017 | Tsai et al. | |

(Continued)

FOREIGN PATENT DOCUMENTS

DE  102017111103 A1  11/2017
JP  2010-151619 A  7/2010

(Continued)

*Primary Examiner* — Peter D Nolan
*Assistant Examiner* — Wae L Louie
(74) *Attorney, Agent, or Firm* — Dinsmore & Shohl LLP (57) ABSTRACT

A self-position estimation accuracy verification method includes a step of moving a mobile object to a first check point, a step of acquiring first check information, a step of starting a self-position estimation using the first check information as an initial value, a step of moving the mobile object to a second check point while continuing the self-position estimation, a step of acquiring second check information, and a step of calculating a deviation between a position and a posture of the mobile object on the map estimated by the self-position estimation at the second check point and a position and a posture of the mobile object on the map indicated in the second check information, and verifying the accuracy of the self-position estimation based on the deviation.

7 Claims, 8 Drawing Sheets

(56) References Cited

U.S. PATENT DOCUMENTS

| | | | |
|---|---|---|---|
| 2020/0019792 A1* | 1/2020 | Sano | G06T 7/70 |
| 2020/0139979 A1* | 5/2020 | Kawanai | G08G 1/166 |
| 2021/0256260 A1* | 8/2021 | Kaneko | G06V 20/20 |
| 2021/0262804 A1* | 8/2021 | Ohira | G01C 25/00 |
| 2021/0263533 A1* | 8/2021 | Motoyama | G06V 20/58 |
| 2022/0137221 A1* | 5/2022 | Hayashi | G01S 17/89 |
| | | | 356/4.01 |
| 2022/0234595 A1* | 7/2022 | Abe | B60W 40/10 |
| 2022/0234601 A1* | 7/2022 | Kamikado | G01C 21/165 |
| 2022/0260667 A1* | 8/2022 | Lev | G01S 5/0284 |
| 2022/0279155 A1* | 9/2022 | Kuranoshita | B64C 39/024 |
| 2022/0292629 A1* | 9/2022 | Ohhashi | G06T 3/0068 |
| 2022/0342427 A1* | 10/2022 | Motoyama | G06V 10/44 |
| 2023/0009012 A1* | 1/2023 | Kai | G06T 7/70 |

FOREIGN PATENT DOCUMENTS

| | | |
|---|---|---|
| JP | 2016-110576 A | 6/2016 |
| WO | 2018/061084 A1 | 4/2018 |

* cited by examiner

SELF-POSITION ESTIMATION ACCURACY VERIFICATION METHOD AND SELF-POSITION ESTIMATION SYSTEM

CROSS-REFERENCE TO RELATED APPLICATION

This application claims priority to Japanese Patent Application No. 2021-012450 filed on Jan. 28, 2021, incorporated herein by reference in its entirety.

BACKGROUND

1. Technical Field

The present disclosure relates to a self-position estimation accuracy verification method of verifying the accuracy of self-position estimation of a mobile object, and to a self-position estimation system.

2. Description of Related Art

WO 2018/061084 discloses a self-position estimation method that enhances the accuracy of self-position estimation by excluding target position data that is estimated to have many errors in terms of a relative position. The self-position estimation method includes detecting a relative position between a mobile object and a target present in the surroundings of the mobile object, accumulating a position where the relative position is moved by an amount by which the mobile object is moved as target position data, selecting the target position data based on reliability of the relative position of the target position data with respect to the mobile object, and checking the selected target position data against map information including the position information on the target present on a road or in the vicinity of the road, thereby estimating a self-position that is a current position of the mobile object.

SUMMARY

In order to start self-position estimation of a mobile object, it is necessary to provide, as initial values, a position and a posture of the mobile object on a map at the start of the self-position estimation. At this time, when the accuracy of the initial values is low, the accuracy of the subsequent self-position estimation is lowered. At the time of verification of the accuracy of the self-position estimation, there is a possibility that the accuracy of the initial values is sufficiently guaranteed and ignored, and the accuracy of the self-position estimation cannot be verified.

The present disclosure provides a self-position estimation accuracy verification method and a self-position estimation system that can guarantee the accuracy of an initial value and appropriately verify the accuracy of self-position estimation.

A self-position estimation accuracy verification method according to a first aspect of the present disclosure is a method of verifying accuracy of self-position estimation that estimates a position and a posture of a mobile object on a map. The self-position estimation accuracy verification method includes an initial step of moving the mobile object to a first check point, a step of specifying a position and a posture of the mobile object positioned at the first check point on the map and acquiring first check information indicating specified information, a step of starting the self-position estimation using the first check information as an initial value, a step of moving the mobile object to a second check point while continuing the self-position estimation, a step of specifying a position and a posture of the mobile object positioned at the second check point on the map and acquiring second check information indicating the specified information, and a verification step of calculating a deviation between a position and a posture of the mobile object on the map estimated by the self-position estimation at the second check point and the position and the posture of the mobile object on the map indicated in the second check information, and verifying the accuracy of the self-position estimation based on the deviation.

Here, the check point is a point at which the position and the posture of the mobile object on the map can be specified by a computer when the mobile object is positioned. Further, the first check point and the second check point are any two check points that are different from each other from among a plurality of check points.

In the first aspect, the self-position estimation accuracy verification method may further include, in the verification step, when the deviation is equal to or higher than a predetermined threshold value, for sets of the first check point and the second check point, which are the same or different from each other, returning to the initial step and repeating each of the steps. When the deviation is equal to or higher than the predetermined threshold value and repetition is executed for the number of times equal to or higher than a predetermined number of times, the accuracy of the self-position estimation may be determined to be lowered.

In the first aspect, in the verification step, when the deviation is lower than the predetermined threshold value, the accuracy of the self-position estimation may be determined to be normal.

A self-position estimation system according to a second aspect of the present disclosure executes self-position estimation that estimates a position and a posture of a mobile object on a map, and includes at least one processor. The processor is configured to execute a position specifying process for specifying the position and the posture of the mobile object on the map when the mobile object is positioned at any of a plurality of check points, a self-position estimation process for executing the self-position estimation using the position and the posture of the mobile object on the map specified in the position specifying process as initial values, and an estimation accuracy verification process for verifying accuracy of the self-position estimation in the self-position estimation process. Further, in the estimation accuracy verification process, the processor is configured to calculate a deviation between a position and a posture of the mobile object on the map indicated by estimation accuracy verification information and a position and a posture of the mobile object indicated by second check information on the map, and verify the accuracy of the self-position estimation based on the deviation.

Here, a first check point and a second check point are any two check points that are different from each other from among the plurality of check points. First check information is information on the position and the posture of the mobile object on the map specified in the position specifying process when the mobile object is positioned at the first check point. The second check information is information on the position and the posture of the mobile object on the map specified in the position specifying process when the mobile object is positioned at the second check point. The estimation accuracy verification information is information on a position and a posture of the mobile object on the map estimated in the self-position estimation process when the mobile object is moved to the second check point after the self-position estimation is started using the first check information as the initial value in the self-position estimation process when the mobile object is positioned at the first check point.

In the second aspect, the estimation accuracy verification information and the second check information may be sequentially given for each of a plurality of the same or different sets of the first check point and the second check point. Then, in the estimation accuracy verification process, the processor may sequentially determine, for the sequentially given estimation accuracy verification information and second check information, whether the deviation is lower than, or equal to or higher than a predetermined threshold value, and determine, upon determining that the deviation is equal to or higher than the threshold value for the number of times equal to or higher than a predetermined number of times, that the accuracy of the self-position estimation is lowered.

In the second aspect, upon determining that the deviation is lower than the predetermined threshold value, the processor may determine that the accuracy of the self-position estimation is normal.

In the second aspect, the mobile object may include a position specifying external sensor. The position specifying external sensor may be a sensor configured to detect information for specifying the position and the posture of the mobile object on the map.

In the second aspect, the self-position estimation system may include a position specifying device. The position specifying device may be an external device configured to specify the position and the posture of the mobile object. The position specifying device may be installed at each of the check points.

According to the present disclosure, when the mobile object is positioned at the first check point, the self-position estimation is started using the first check information as the initial value. Then, after moving the mobile object to the second check point while continuing the self-position estimation, the accuracy of the self-position estimation is verified based on the deviation between the estimation accuracy verification information and the second check information. As such, it is possible to guarantee the accuracy of the initial values of the self-position estimation, and appropriately verify the accuracy of the self-position estimation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. However, when numbers, such as a quantity, amount, range, and the like, of each element are referred to in the embodiments described below, the present disclosure is not limited to the described numbers unless they are explicitly stated or the number is clearly specified in principle. Further, structures, and the like, described in the embodiments below are not necessarily to the present disclosure unless they are explicitly stated or clearly specified in principle. In each drawing, the same or corresponding parts are denoted by the same reference signs, and the duplicated description thereof will be appropriately simplified or omitted.

A self-position estimation accuracy verification method and a self-position estimation system described in the present embodiment relate to self-position estimation of a mobile object, such as a vehicle or a mobile robot. In particular, the present disclosure relates to the self-position estimation that gives a position and a posture of a mobile object on a map, which are used by the mobile object that autonomously travels when executing an autonomous traveling control. Hereinbelow, a target mobile object will be described as a vehicle that autonomously travels.

1. First Embodiment 1-1. Configuration of Vehicle System

Figure 1:
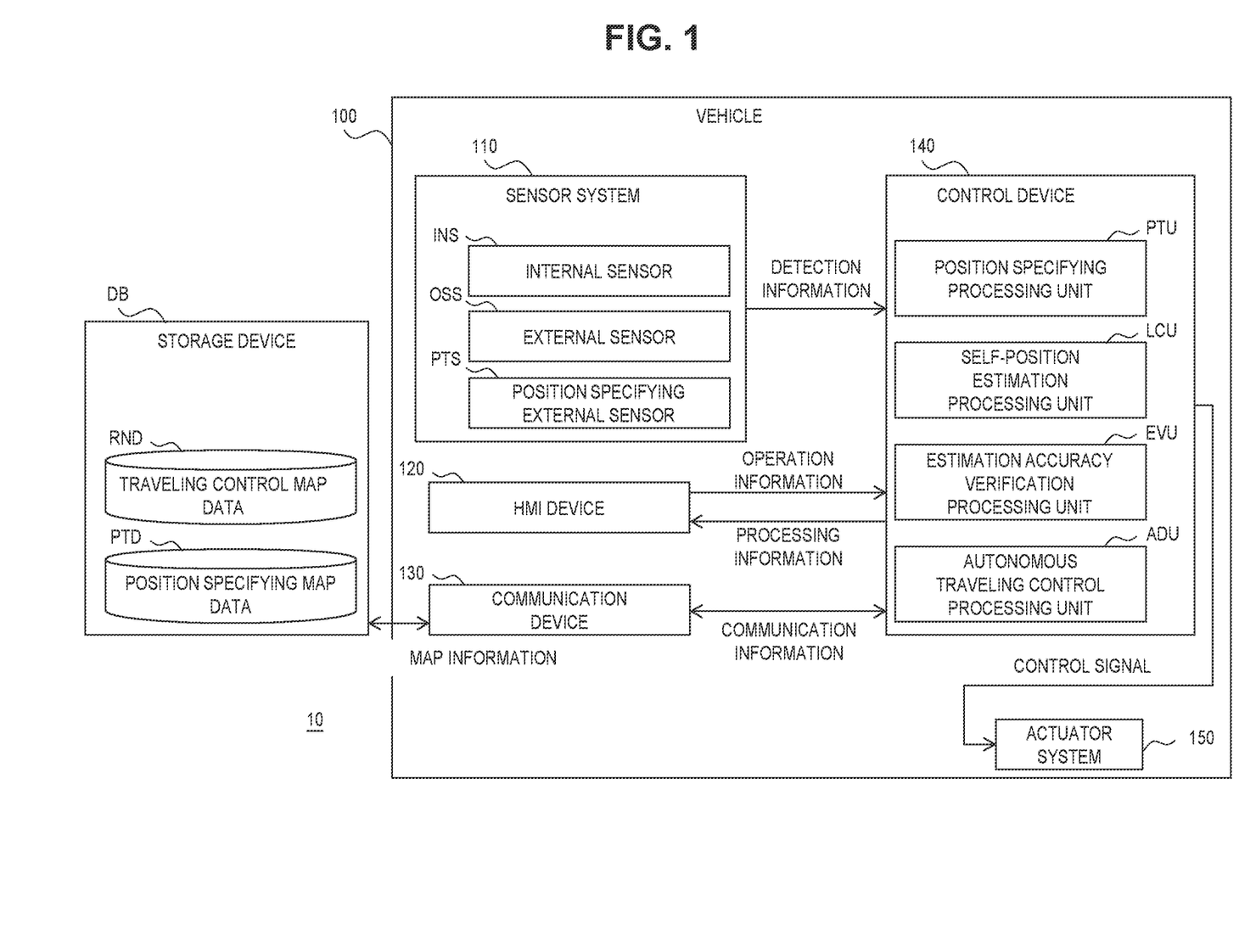
FIG. 1 is a block diagram used for describing a configuration of a vehicle system according to a first embodiment.

FIG. 1 is a block diagram used for describing a configuration of a vehicle system 10 according to a first embodiment. A vehicle system 10 according to the first embodiment includes a vehicle 100 and a storage device DB.

The vehicle 100 is an autonomously driving vehicle that can autonomously travel. The vehicle 100 includes a sensor system 110, an HMI device 120, a communication device 130, a control device 140, and an actuator system 150. The control device 140 constitutes a network so as to be capable of transferring information with each of the sensor system 110, the HMI device 120, the communication device 130, and the actuator system 150. Typically, the network is an in-vehicle network in which they are electrically connected to each other via a wire harness.

The sensor system 110 indicates a system of sensors that are provided in the vehicle 100, and detect and output various pieces of information necessary for controlling the vehicle 100. The sensor system 110 includes an internal sensor INS, an external sensor OSS, and a position specifying external sensor PTS.

The internal sensor INS detects information inside the vehicle 100, such as a traveling state. Examples of the internal sensor INS include a wheel speed sensor that detects speed of the vehicle 100, an acceleration sensor that detects acceleration of the vehicle 100, and an angular velocity sensor that detects a yaw rate of the vehicle 100.

The external sensor OSS detects information on the outside of the vehicle 100, such as the surrounding environment (a vehicle lane, an obstacle, a preceding vehicle, and the like). Examples thereof include a millimeter-wave radar, a sensor camera, and Light Detection and Ranging (LiDAR).

The position specifying external sensor PTS detects information for specifying (hereinafter, also referred to as "position specifying") a position and a posture of the vehicle 100 on a map. The position specifying external sensor PTS is an appropriate sensor according to a method of specifying the position of the vehicle 100. The method of specifying the position of the vehicle 100 will be described below. Here, the position specifying external sensor PTS may be the same as the external sensor OSS. In this case, the position of the vehicle 100 is specified based on information of the external sensor OSS.

The HMI device 120 gives various pieces of information (operation information) to the control device 140 by an operation of an operator of the vehicle 100 and the like, and has a function of notifying the operator and the like of information (processing information) on processing executed by the control device 140. Examples of the HMI device 120 include a switch, a touch panel display, an automobile meter, or a combination thereof.

The communication device 130 transmits/receives various pieces of information (communication information) by communicating with an external device of the vehicle 100. The communication device 130 includes, for example, a device that is connected to a network, such as the Internet, and transmits/receives information to/from a device on the network, a device that executes inter-vehicle communication or road-to-vehicle communication, a Global Positioning System (GPS) receiver, or a system of devices including the above devices. The communication device 130 is configured so as to be capable of acquiring information from at least a storage device DB described below. Examples of the information acquired by the control device 140 via the communication device 130 include map information, position information on a map using the GPS, and road traffic information.

Based on the acquired information, the control device 140 executes processing for controlling the vehicle 100 and generates a control signal. Then, the control device 140 outputs the control signal to the actuator system 150. The control device 140 is typically an electronic control unit (ECU) that includes a memory and a processor. Alternatively, the control device 140 may be an external device of the vehicle 100. The memory includes a random access memory (RAM) that temporarily stores data and a read-only memory (ROM) that stores a program that can be executed by the processor or various pieces of data associated with the program. The information acquired by the control device 140 is stored in the memory. The processor reads the program from the memory and executes processing according to the program based on the various pieces of data read from the memory.

The control device 140 includes a position specifying processing unit PTU, a self-position estimation processing unit LCU, an estimation accuracy verification processing unit EVU, and an autonomous traveling control processing unit ADU.

When the vehicle 100 is positioned at any of a plurality of specific points (hereinafter, also referred to as "check points"), the position specifying processing unit PTU executes processing for specifying the position of the vehicle 100 based on detection information by the position specifying external sensor PTS and the map information by position specifying map data PTD that is described below, and calculates the position and the posture (hereinafter, also referred to as "check information") of the specified vehicle 100 on the map. In other words, the check point is a point at which the position specifying processing unit PTU can specify the position of the vehicle 100 when the vehicle 100 is positioned. The position specifying processing unit PTU executes appropriate processing according to the method of specifying the position of the vehicle 100. The method of specifying the position of the vehicle 100 will be described below.

Here, as the position and the posture of the vehicle 100 on the map given as the check information, the same information as the result of the self-position estimation by the self-position estimation processing unit LCU is given. For example, as the result of the self-position estimation by the self-position estimation processing unit LCU, the position of the vehicle 100 on the map is given as two-dimensional coordinates (xe,ye) and the posture of the vehicle 100 is given as a yaw angle θe. At this time, the position specifying processing unit PTU calculates the check information that gives the position of the vehicle 100 on the map as the two-dimensional coordinates (x,y) and the posture of the vehicle 100 as the yaw angle θ.

The self-position estimation processing unit LCU executes processing for self-position estimation of the vehicle 100 based on the detection information by the internal sensor INS and the external sensor OSS and the map information by traveling control map data RND that is described below, and outputs the result of the self-position estimation. Typically, the self-position estimation processing unit LCU starts the processing using the already-known position and posture of the vehicle 100 on the map as the initial values, and estimates the position and the posture of the vehicle 100 on the map every moment from a movement amount of the vehicle 100 and a positional relationship between the vehicle 100 and the surrounding environment. The movement amount of the vehicle 100 is calculated based on the detection information by the internal sensor INS. The positional relationship between the vehicle 100 and the surrounding environment is calculated based on the detection information by the external sensor OSS and the map information by the traveling control map data RND.

Here, the self-position estimation processing unit LCU according to the present embodiment uses the check information calculated by the position specifying processing unit PTU as the initial values. Further, the degree of freedom of the position and the posture of the vehicle 100 on the map given as the result of the self-position estimation by the self-position estimation processing unit LCU is not particularly limited. For example, the position of the vehicle 100 on the map may be given as two-dimensional coordinates (xe,ye), and the posture of the vehicle 100 may be given as a yaw angle θe, or each of the position and the posture of the vehicle 100 on the map may be given as the three degrees of freedom.

When executing the self-position estimation, the self-position estimation processing unit LCU may create an environment map. In other words, the self-position estimation processing unit LCU may execute processing for simultaneous localization and mapping (SLAM). In this case, the self-position estimation may be executed based on the map information by the created environment map. Examples of the environment map include point group data detected by the LiDAR. Further, the created environment map may be stored in the memory of the control device 140 or stored as the traveling control map data RND in the storage device DB via the communication device 130.

The estimation accuracy verification processing unit EVU verifies the accuracy of the self-position estimation executed by the self-position estimation processing unit LCU. The estimation accuracy verification processing unit EVU verifies the accuracy of the self-position estimation executed by the self-position estimation processing unit LCU based on a deviation between the check information calculated by the position specifying processing unit PTU and the self-position estimation result of the vehicle 100 by the self-position estimation processing unit LCU. Details of the processing executed by the estimation accuracy verification processing unit EVU will be described below.

The autonomous traveling control processing unit ADU executes processing for autonomous traveling of the vehicle 100 and generates a control signal for the autonomous traveling. Typically, the autonomous traveling control processing unit ADU sets a traveling plan to a destination (a route on the map to the destination, an arrival time, and the like) and generates a traveling route based on the traveling plan and the acquired information. Then, the autonomous traveling control processing unit ADU generates the control signals for acceleration, braking, and steering such that the vehicle 100 travels along the traveling route. Here, the information based on when the traveling route is generated includes the self-position estimation result of the vehicle 100 by the self-position estimation processing unit LCU.

The control device 140 may execute other processing for controlling the vehicle 100. Each of the position specifying processing unit PTU, the self-position estimation processing unit LCU, the estimation accuracy verification processing unit EVU, the autonomous traveling control processing unit ADU, or any other part that executes the processing for controlling may be given as a part of one program, or given as a separate program for each process or for each group of processes and executed by a separate processor. Alternatively, each process or a group of processes may be executed by a separate ECU. In this case, the control device 140 is a system that consists of a plurality of ECUs, and each of the ECUs is configured so as to be capable of transferring information to each other such that necessary information can be acquired when executing a process.

The actuator system 150 indicates a system of actuators that operate according to a control signal given from the control device 140. The actuator system 150 includes, for example, an actuator that drives an engine (an internal combustion engine, an electric motor, or a hybrid thereof, and the like), an actuator that drives a brake mechanism provided in the vehicle 100, and an actuator that drives a steering mechanism of the vehicle 100. Each actuator included in the actuator system 150 operates according to the control signal, and thus various controls of the vehicle 100 by the control device 140 are implemented.

The storage device DB stores various pieces of data and outputs information on the stored data. Typically, it is a database server configured on the network. However, it may also be virtually configured. The traveling control map data RND and the position specifying map data PTD are stored in the storage device DB.

The traveling control map data RND is a collection of map information of an object on earth, and is referred to when executing the self-position estimation, the autonomous traveling control, or other traveling controls. The map information of the object includes at least information of a position of the object on the map. Here, the object may include a feature point representing a white line or the like, or a detection point by the LiDAR. The traveling control map data RND is typically point group data or highly accurate three-dimensional map data. Alternatively, it may include information of the environment map created by the self-position estimation processing unit LCU.

The position specifying map data PTD indicates map information for specifying the position of the vehicle 100, and includes map information referred to when the position is specified. As the position specifying map data PTD, appropriate data according to the method of specifying the position of the vehicle 100 is given. The method of specifying the position of the vehicle 100 will be described below. Here, the position specifying map data PTD may be the same as the traveling control map data RND. In this case, for specifying the position of the vehicle 100, the map information by the traveling control map data RND is referred to.

The position specifying map data PTD and the traveling control map data RND may be stored in the memory of the control device 140. In this case, the position specifying processing unit PTU, the self-position estimation processing unit LCU, and the autonomous traveling control processing unit ADU refer to the map information by the traveling control map data RND or the position specifying map data PTD stored in the memory of the control device 140.

1-2. Self-Position Estimation System

Figure 2:
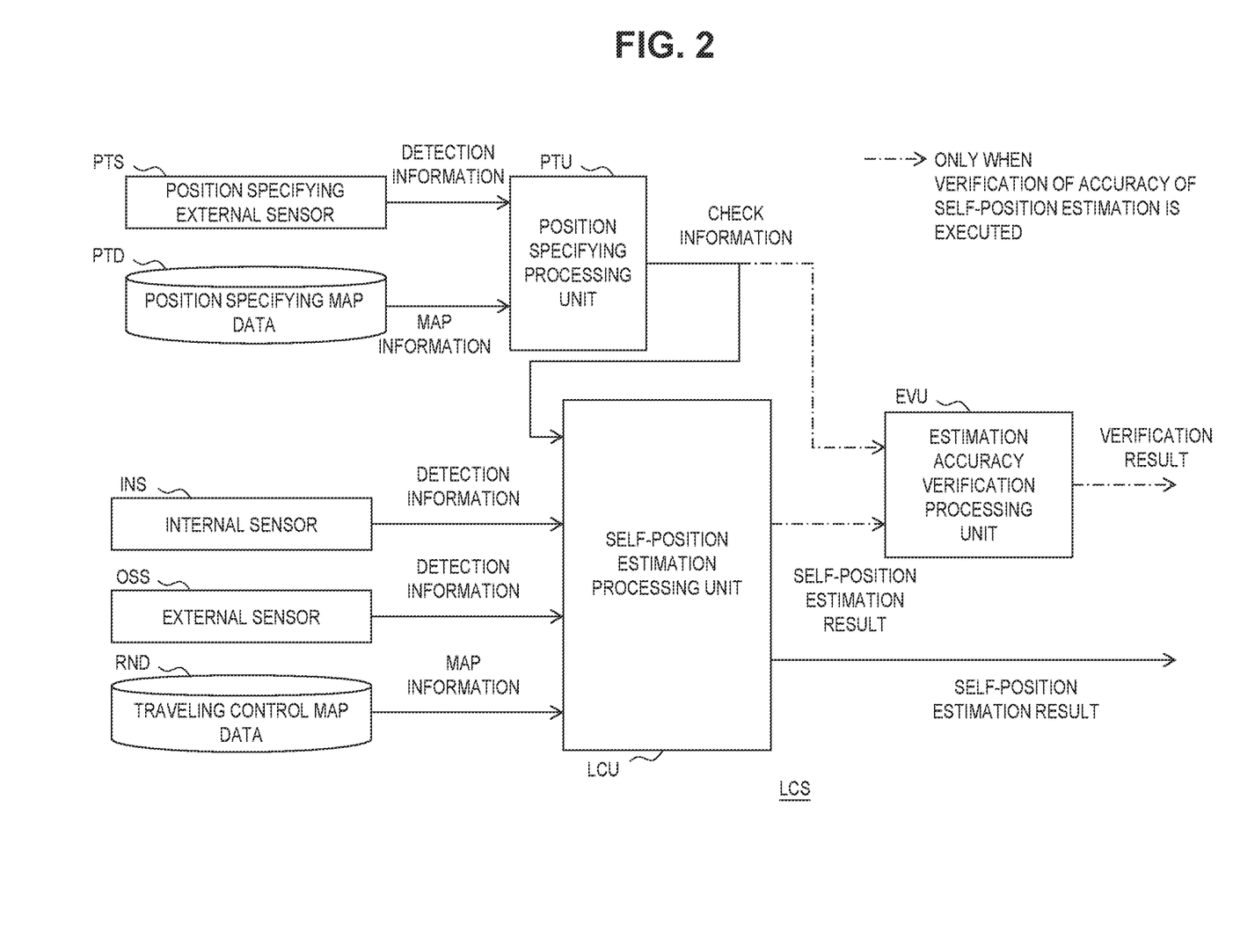
FIG. 2 is a block diagram used for describing a self-position estimation system implemented by the vehicle system according to the present embodiment.

FIG. 2 is a block diagram used for describing the self-position estimation system LCS implemented by the vehicle system 10 according to the first embodiment. FIG. 2 illustrates transfer of the information when the self-position estimation and the verification of the accuracy of self-position estimation are executed. However, arrows represented by dash-dot-dash lines indicate the transfer of the information that is generated only when the verification of the accuracy of self-position estimation is executed. Further, in FIG. 2, parts that mediate the transfer of the information are omitted. For example, the communication device 130 is not shown.

The position specifying processing unit PTU calculates the check information of the vehicle 100 based on the detection information by the position specifying external sensor PTS and the map information by the position specifying map data PTD. Then, the position specifying processing unit PTU transfers the calculated check information to the self-position estimation processing unit LCU. When the verification of the accuracy of self-position estimation is executed, the position specifying processing unit PTU further transfers the calculated check information to the estimation accuracy verification processing unit EVU.

The self-position estimation processing unit LCU estimates the self-position of the vehicle 100 using the check information acquired from the position specifying external sensor PTS as the initial value based on the detection information by the internal sensor INS, the detection information by the external sensor OSS, and the map information by the traveling control map data RND. Then, the self-position estimation processing unit LCU outputs a result of the self-position estimation. When the verification of the accuracy of self-position estimation is executed, the self-position estimation processing unit LCU transfers the result of self-position estimation to the estimation accuracy verification processing unit EVU.

When executing the verification of the accuracy of self-position estimation, based on the deviation between the check information acquired from the position specifying processing unit PTU and the self-position estimation result acquired from the self-position estimation processing unit LCU, the estimation accuracy verification processing unit EVU verifies the accuracy of the self-position estimation, which is executed by the self-position estimation processing unit LCU. Then, the estimation accuracy verification processing unit EVU outputs the verification result of the accuracy of self-position estimation.

1-3. Method of Specifying Position of Vehicle

The vehicle system 10 according to the first embodiment specifies (position specifying) the position and the posture of the vehicle 100 on the map when the vehicle 100 is positioned at any of the plurality of check points. Hereinafter, the method of specifying the position of the vehicle 100 in the vehicle system 10 according to the first embodiment will be described.

Figure 3:
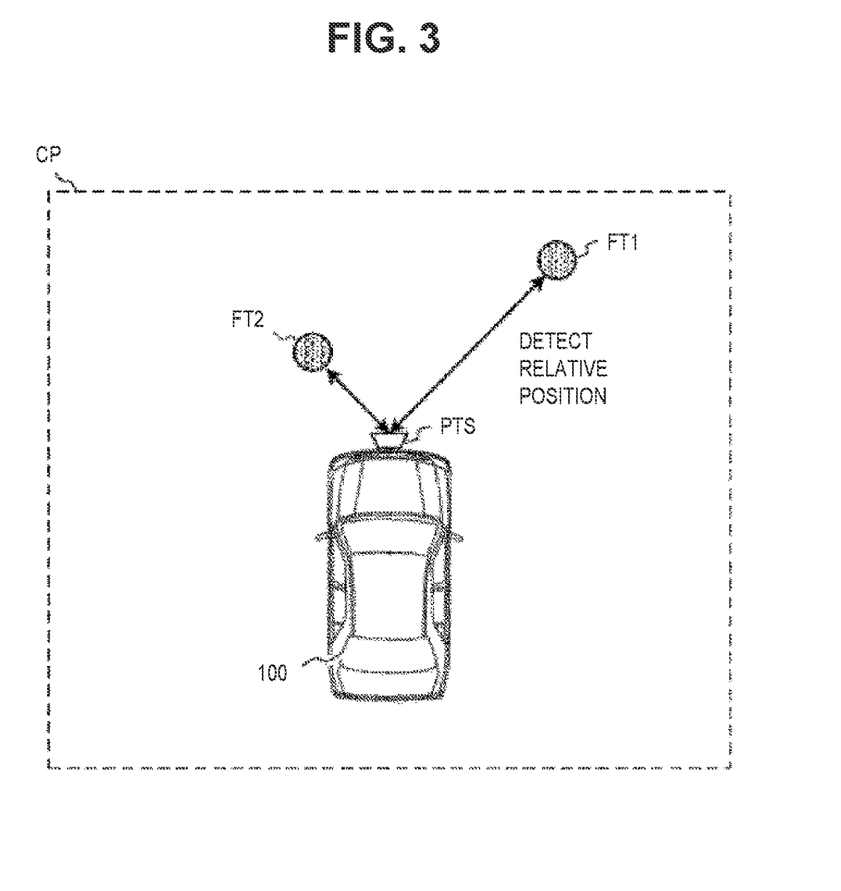
FIG. 3 is a conceptual diagram illustrating an example of a method of specifying a position of a vehicle in the vehicle system according to the first embodiment.

FIG. 3 is a conceptual diagram illustrating one example of the method of specifying the position of the vehicle 100. In the example illustrated in FIG. 3, two objects FT1, FT2 are installed at a check point CP. In this example, the position specifying map data PTD is given so as to include information on positions of objects on the map installed at the check point CP. In other words, the position specifying map data PTD includes information on the positions of the two objects FT1, FT2 on the map. Therefore, the position specifying external sensor PTS detects a relative position between the vehicle 100 and the objects FT1, FT2, thereby specifying the position of the vehicle 100.

In other words, the position specifying processing unit PTU calculates the check information of the vehicle 100 based on the information on the position of the objects FT1, FT2 on the map acquired from the position specifying map data PTD and the information on the relative position between the vehicle 100 and the objects FT1, FT2 acquired from the position specifying external sensor PTS. In this case, examples of the position specifying external sensor PTS include a millimeter-wave radar, a sensor camera, LiDAR, or a combination thereof.

The check point CP may include three or more objects. Further, each object included in the check point CP can be distinguished from each other by the position specifying external sensor PTS, and is configured such that its corresponding position information can be appropriately acquired from the position specifying map data PTD. For example, each object is configured to have a shape, color, or a pattern that can be distinguished from each other by image recognition of a sensor camera or the LiDAR. Alternatively, each object may be provided with an optical reflector (for example, a reflector having a different reflectance for millimeter-wave radio waves) and the like that can be distinguished from each other by a millimeter-wave radar.

Figure 4:
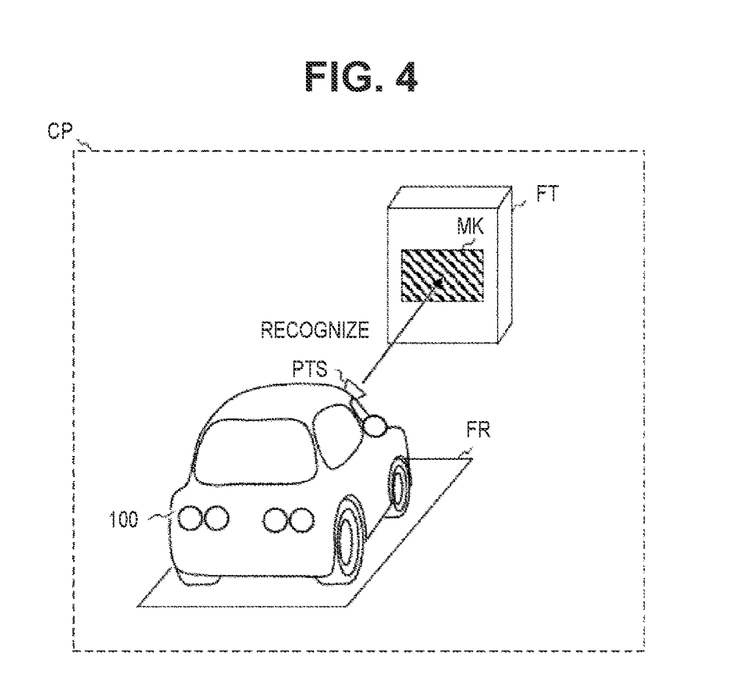
FIG. 4 is a conceptual diagram illustrating another example of the method of specifying the position of the vehicle in the vehicle system according to the first embodiment.

FIG. 4 is a conceptual diagram illustrating another example of the method of specifying the position of the vehicle 100. In the example illustrated in FIG. 4, parking lines FR that define a parking place of the vehicle 100 are marked and an object FT is installed in the vicinity of the parking lines FR at the check point CP. Further, the object FT is marked with a mark MK that can be recognized by the position specifying external sensor PTS. The mark MK corresponds to information on the position and the posture of the vehicle 100 on the map when the vehicle 100 is parked along the parking lines FR. Therefore, when the vehicle 100 is parked along the parking lines FR, the position specifying external sensor PTS acquires the map information corresponding to the mark MK by recognizing the mark MK. As such, it is possible to specify the position of the vehicle 100.

The mark MK is a code, such as a two-dimensional code, and specific information can be acquired by recognizing it. In this case, the position specifying external sensor PTS is a reading sensor corresponding to the mark MK, such as a code reader or the like. Further, in this case, the information directly obtained by recognizing the mark MK may be an ID corresponding to the map information on the position and the posture of the vehicle 100 on the map. In other words, the position of the vehicle 100 may be specified when the position specifying external sensor PTS acquires the ID by recognizing the mark MK, and the position specifying processing unit PTU acquires, from the position specifying map data PTD, the map information corresponding to the acquired ID. Therefore, in this case, the position specifying map data PTD is data to which the map information is given for each ID.

Further, the mark MK may be a specific color or a pattern that can be recognized and distinguished by the sensor camera or LiDAR, or a specific optical reflector that can be recognized and distinguished by the millimeter-wave radar. In this case, the position specifying external sensor PTS is the millimeter-wave radar, the sensor camera, or LiDAR, and the position of the vehicle 100 is specified in the same manner as above.

Further, the position specifying external sensor PTS may detect a relative position between the parking lines FR and the vehicle 100, and, based on the detected relative position, the position specifying processing unit PTU may correct the information on the position and the posture of the vehicle 100 on the map obtained from the mark MK. As such, it is possible to further enhance the accuracy of specifying the position of the vehicle 100. In this case, the position specifying external sensor PTS includes a sensor that is used for recognizing the mark MK and a sensor (the sensor camera, the LiDAR, and the like) that can detect the relative position between the parking lines FR and the vehicle 100. However, the recognition of the mark MK and the detection of the relative position between the parking lines FR and the vehicle 100 may be executed by the same sensor.

Figure 5:
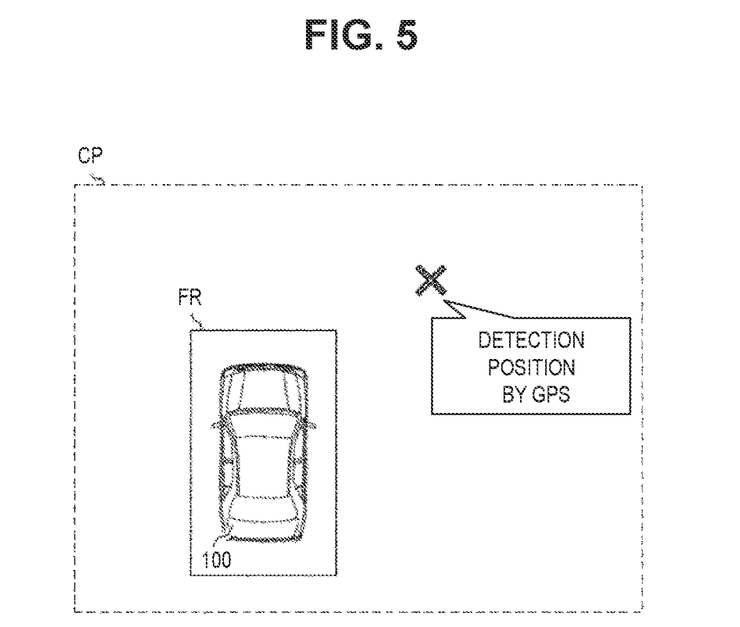
FIG. 5 is a conceptual diagram illustrating still another example of the method of specifying the position of the vehicle in the vehicle system according to the first embodiment.

FIG. 5 is a conceptual diagram illustrating still another example of the method of specifying the position of the vehicle 100. In the example illustrated in FIG. 5, the parking lines FR that define a parking place for the vehicle 100 are marked at the check point CP. Further, the position specifying map data PTD includes the information on positions and postures of the vehicle 100 on the map when the vehicle 100 is parked along the parking lines FR, for respective parking lines FR marked at the plurality of check points.

In the example illustrated in FIG. 5, the position of the vehicle 100 is specified while the vehicle 100 is parked along the parking lines FR. When the position is specified, the vehicle 100 detects its position on the map using the GPS. Then, the position specifying processing unit PTU estimates that the vehicle 100 is parked at parking lines FR closest to the position of the vehicle 100 on the map detected by the GPS, and specifies the position of the vehicle 100. In other words, the position specifying processing unit PTU acquires, from the position specifying map data PTD, map information on the parking lines FR closest to the position of the vehicle 100 on the map detected by the GPS, and uses the position and the posture of the vehicle 100 on the map indicated by the acquired map information as check information of the vehicle 100.

Here, when the position specifying map data PTD does not include the map information on the parking lines FR that is sufficiently close to the position of the vehicle 100 on the map detected by the GPS, the position specifying processing unit PTU may determine that the position cannot be specified. This means that, for example, the position specifying map data PTD can determine as above when all the deviations between the information on the position of the vehicle 100 on the map for the respective parking lines FR included in the position specifying map data PTD and the position of the vehicle 100 on the map detected by the GPS are higher than a predetermined threshold value. At this time, the position specifying processing unit PTU may notify (display, make a sound, and the like) the operator, and the like, of the vehicle 100 that the position cannot be specified via the HMI device 120.

Further, the position specifying external sensor PTS may detect the relative position between the parking lines FR and the vehicle 100, and the position specifying processing unit PTU may correct, based on the detected relative position, the map information on the parking lines FR acquired from the position specifying map data PTD.

The examples of the method of specifying the position of the vehicle 100 have been described above, but the position of the vehicle 100 may be specified by other methods.

1-4. Self-Position Estimation Accuracy Verification Method

Figure 6:
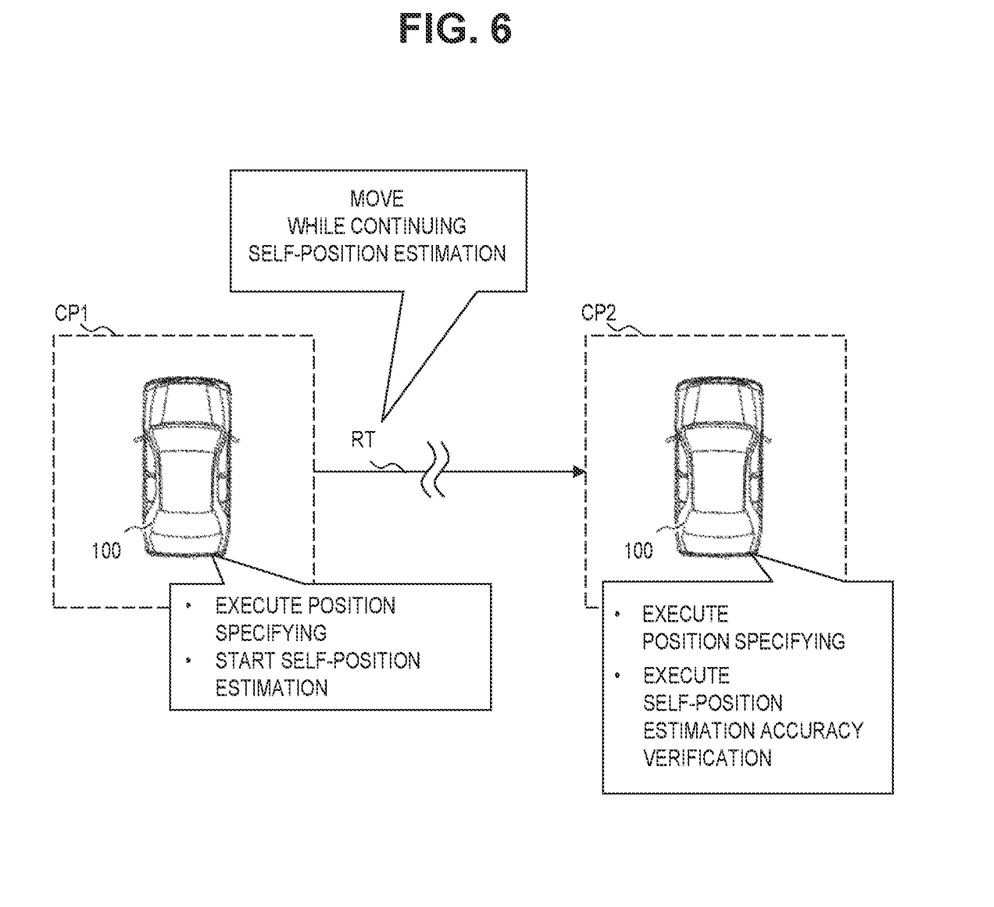
FIG. 6 is a conceptual diagram used for describing an overview of a self-position estimation accuracy verification method according to the present embodiment.

FIG. 6 is a conceptual diagram used for describing an overview of a self-position estimation accuracy verification method according to the present embodiment. The self-position estimation accuracy verification method according to the present embodiment is a method of verifying the accuracy of the self-position estimation of the vehicle 100, which is executed by the self-position estimation processing unit LCU. The self-position estimation accuracy verification method is executed at any two check points that are different from each other from among the plurality of check points. FIG. 6 illustrates a first check point CP1 and a second check point CP2 as the two check points.

First, the vehicle 100 is moved to the first check point CP1 (an initial step). After the vehicle 100 is moved to the first check point CP1, the position specifying processing unit PTU specifies the position of the vehicle 100, and acquires check information of the vehicle 100 at the first check point CP1 (hereinafter, also referred to as "first check information"). Thereafter, the self-position estimation processing unit LCU starts the self-position estimation using the first check information as the initial value.

Next, the vehicle 100 is moved to the second check point CP2 (RT) while the self-position estimation processing unit LCU continues the self-position estimation. Here, the vehicle 100 may be moved to the second check point CP2 (RT) in any manner. For example, it may be moved by the autonomous traveling control by the autonomous traveling control processing unit ADU, or moved by manual driving or towing.

After the vehicle 100 is moved to the second check point CP2, the position specifying processing unit PTU specifies the position of the vehicle 100, and acquires check information of the vehicle 100 at the second check point CP2 (hereinafter, also referred to as "second check information"). Then, the estimation accuracy verification processing unit EVU verifies the accuracy of the self-position estimation based on a deviation between the second check information and the result of the self-position estimation (hereinafter, also referred to as "estimation accuracy verification information") which is executed by the self-position estimation processing unit LCU at the second check point CP2 (a verification step).

Here, when a verification result is not given by the estimation accuracy verification processing unit EVU, the same procedures are repeated for the same or different sets of the first check point CP1 and the second check point CP2. For example, the check points designated as the first check point CP1 and the second check point CP2 are switched, and the same procedures are repeated.

Figure 7:
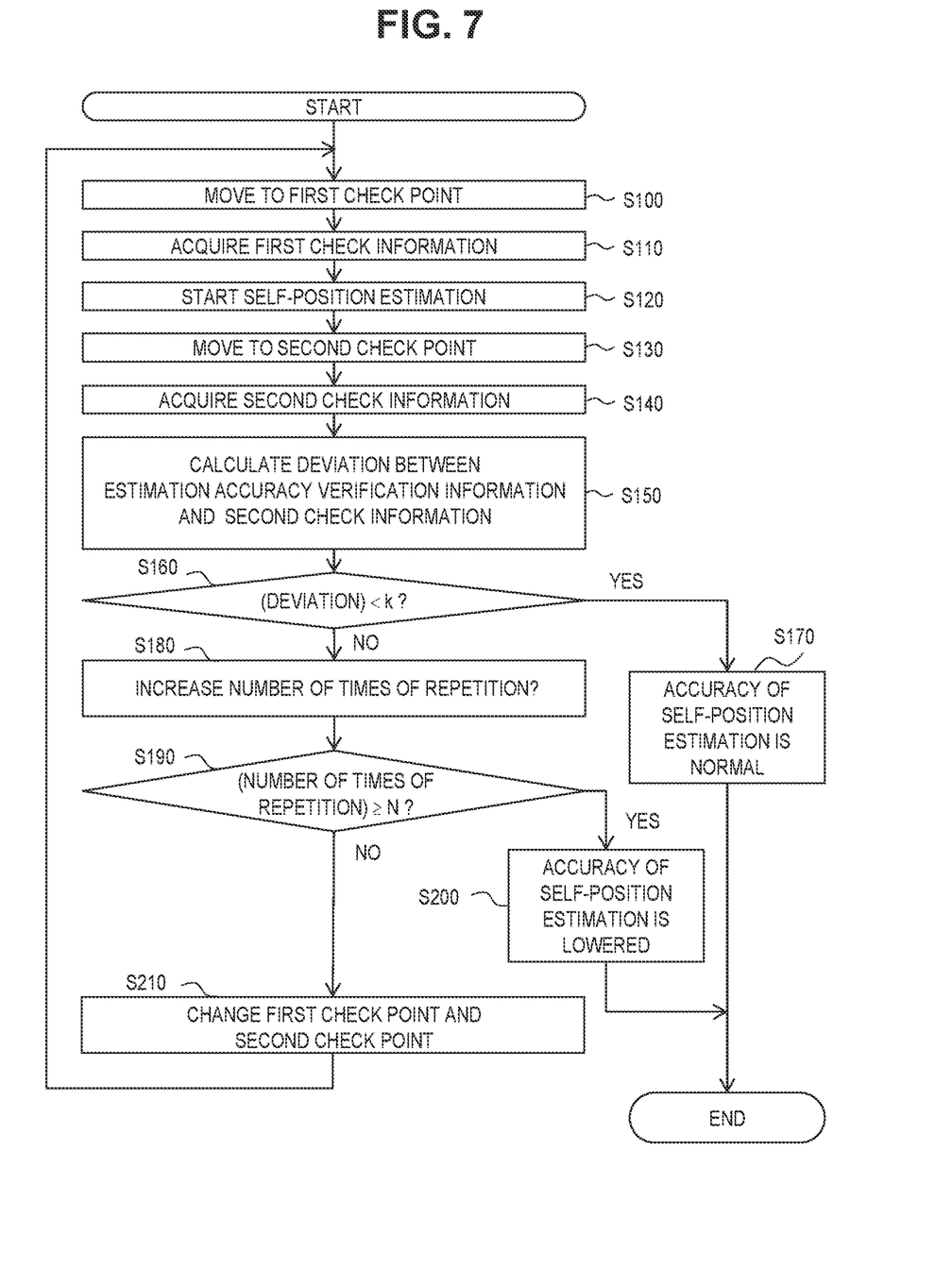
FIG. 7 is a flowchart illustrating procedures of the self-position estimation accuracy verification method according to the present embodiment.

FIG. 7 is a flowchart illustrating the procedures of the self-position estimation accuracy verification method according to the present embodiment. Details of the self-position estimation accuracy verification method according to the present embodiment will be described with reference to the flowchart illustrated in FIG. 7.

In step S100 (the initial step), the vehicle 100 is moved to the first check point CP1. The first check point CP1 may be any of the plurality of check points. Further, the vehicle 100 may be moved to the first check point CP1 in any manner. After step S100, the process proceeds to step S110.

In step S110, the first check information is acquired. The position specifying processing unit PTU calculates the first check information. After step S110, the process proceeds to step S120.

In step S120, the self-position estimation processing unit LCU starts the self-position estimation using the first check information as the initial value. After step S120, the process proceeds to step S130.

In step S130, the vehicle 100 is moved to the second check point CP2 while the self-position estimation processing unit LCU continues the self-position estimation. The second check point CP2 may be any of the plurality of check points as long as it is different from the first check point CP1. Further, the vehicle 100 may be moved to the second check point CP2 in any manner. After step S130, the process proceeds to step S140.

In step S140, the second check information is acquired. The position specifying processing unit PTU calculates the second check information. After step S140, the process proceeds to step S150. Here, the estimation accuracy verification processing unit EVU executes the procedures (the verification step) described in steps S150 to S200.

In step S150, the estimation accuracy verification processing unit EVU acquires the estimation accuracy verification information and the second check information from the position specifying processing unit PTU and the self-position estimation processing unit LCU, and calculates a deviation between the position and the posture of the vehicle 100 on the map indicated by the estimation accuracy verification information and the position and the posture of the vehicle 100 on the map indicated by the second check information.

Here, an example of calculating the deviation is described below. As the second check information, it is assumed that the position of the vehicle 100 on the map is given as two-dimensional coordinates (x2,y2) and the posture of the vehicle 100 is given as a yaw angle θ2. Further, as the estimation accuracy verification information, it is assumed that the position of the vehicle 100 on the map is given as the two-dimensional coordinates (xe,ye) and the posture of the vehicle 100 is given as a yaw angle θe. At this time, the deviation is calculated according to the following equation (1):

[Formula 1]

$$|x2-xe|^2+|y2-ye|^2+|\theta 2-\theta e|^2 \quad (1)$$

Similarly, the deviation may be calculated for each of the position and the posture of the vehicle 100 on the map. After step S150, the process proceeds to step S160.

In step S160, the estimation accuracy verification processing unit EVU determines whether the deviation calculated in step S150 is lower than a predetermined threshold value k. Here, the threshold value k is a value given to the program in advance. This is optimally and experimentally determined by, for example, vehicle compatibility of the vehicle 100 to which the vehicle system 10 according to the present embodiment is applied.

When the deviation is lower than the threshold value k (step S160: Yes), the estimation accuracy verification processing unit EVU determines that the accuracy of the self-position estimation executed by the self-position estimation processing unit LCU is normal (step S170), and the process ends. On the other hand, when the deviation is equal to or higher than the predetermined threshold value k (step S160: No), the process proceeds to step S180.

In step S180, the estimation accuracy verification processing unit EVU increases the number of times that the procedures are repeated. Here, the number of times of repetition is initialized at the start of the procedures illustrated in FIG. 7 (for example, the number of times of repetition is set to zero). After step S180, the process proceeds to step S190.

In step S190, the estimation accuracy verification processing unit EVU determines whether the number of times of repetition is equal to or higher than a predetermined number of times N. Here, the predetermined number of times N is a value given to the program in advance.

When the number of times of repetition is equal to or higher than the predetermined number of times N (step S190: Yes), the estimation accuracy verification processing unit EVU determines that the accuracy of the self-position estimation executed by the self-position estimation processing unit LCU is lowered (step S200), and the process ends. On the other hand, when the number of times of repetition is lower than the predetermined number of times N (step S190: No), the estimation accuracy verification processing unit EVU does not give the verification result, and the process proceeds to step S210.

In step S210, the first check point CP1 and the second check point CP2 are changed. For example, the check points designated as the first check point CP1 and the second check point CP2 are switched. After step S210, the process returns to step S100 and the procedures are repeated. Here, the process of step S210 is not necessary. In other words, the procedures may be repeated for the same set of the first check point and the second check point.

As above, the self-position estimation accuracy verification method has been described. Whether to start processing or a response may be determined according to the verification result by the self-position accuracy verification estimation method. For example, when the estimation accuracy verification processing unit EVU determines that the accuracy of the self-position estimation is normal (step S170), the autonomous traveling control processing unit ADU starts the processing for the autonomous traveling control. As another example, when the estimation accuracy verification processing unit EVU determines that the accuracy of the self-position estimation is lowered (step S200), a failure of devices (the sensor system 110, the control device 140, the actuator system 150, and the like) for the self-position estimation is confirmed.

Further, even when the estimation accuracy verification processing unit EVU determines the accuracy of the self-position estimation is normal (step S170), in a case where the repetition is executed at least once, whether to execute processing or a response may be determined according to the number of times of repetition. For example, a notification to call attention is sent to the operator and the like via the HMI device 120. Alternatively, as another example, the fact that the repetition has been executed is recorded in the memory of the control device 140.

2. Second Embodiment

Hereinafter, a second embodiment will be described. The already-described content above will be appropriately omitted.

2-1. Configuration of Vehicle System

Figure 8:
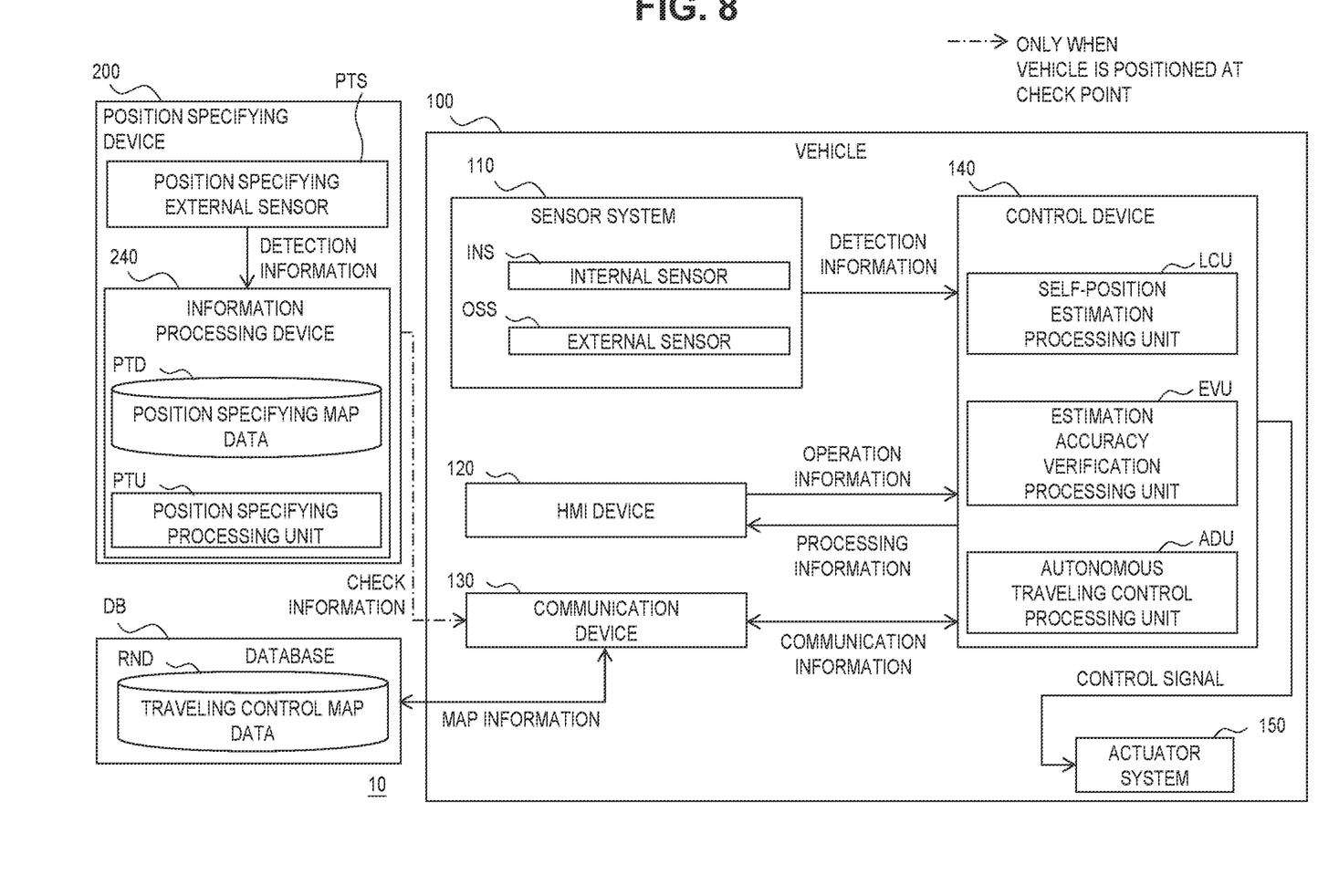
FIG. 8 is a block diagram used for describing a configuration of a vehicle system according to a second embodiment.

In the second embodiment, the position of the vehicle 100 is specified by an external device. FIG. 8 is a block diagram used for describing a configuration of a vehicle system 10 according to the second embodiment. As illustrated in FIG. 8, in the second embodiment, the sensor system 110 of the vehicle 100 does not include the position specifying external sensor PTS, and the control device 140 does not include the position specifying processing unit PTU. On the other hand, the vehicle system 10 according to the second embodiment includes a position specifying device 200.

The position specifying device 200 is an external device that specifies the position of the vehicle 100. The position specifying device 200 is installed at each of a plurality of check points CP. Alternatively, the position specifying device 200 may be a specific device prepared when the position of the vehicle 100 is specified. When the vehicle 100 is positioned at each check point, the position specifying device 200 specifies the position of the vehicle 100 and calculates the check information. Then, as represented by a dash-dot-dash line in FIG. 8, the check information of the vehicle 100 is transferred to the vehicle 100 via the communication device 130. Here, communication between the position specifying device 200 and the vehicle 100 may be in any manner. For example, the communication may be via radio waves or a network, such as the Internet.

The check information of the vehicle 100 may be transferred to the vehicle 100 via the HMI device 120. In this case, the check information calculated by the position specifying device 200 is given by an operation of the HMI device 120, and, as a result, the check information is transferred to the control device 140 as operation information of the HMI device 120.

The position specifying device 200 includes the position specifying external sensor PTS and an information processing device 240.

The position specifying external sensor PTS is an appropriate sensor according to a method by which the position specifying device 200 specifies the position of the vehicle 100. The method by which the position specifying device 200 specifies the position of the vehicle 100 will be described below.

The information processing device 240 is typically a computer that includes a memory and a processor. The information processing device 240 stores the position specifying map data PTD. The information processing device 240 also includes the position specifying processing unit PTU. The position specifying processing unit PTU calculates the check information of the vehicle 100 based on the detection information by the position specifying external sensor PTS and the map information by the position specifying map data PTD. The position specifying processing unit PTU executes appropriate processing according to the method by which the position specifying device 200 specifies the position of the vehicle 100. The method by which the position specifying device 200 specifies the position of the vehicle 100 will be described below.

The self-position estimation system LCS implemented by the vehicle system 10 according to the second embodiment is the same as that illustrated in FIG. 2.

2-2. Method of Specifying Position of Vehicle

Hereinafter, in the vehicle system 10 according to the second embodiment, the method by which the position specifying device 200 specifies the position of the vehicle 100 will be described.

Figure 9:
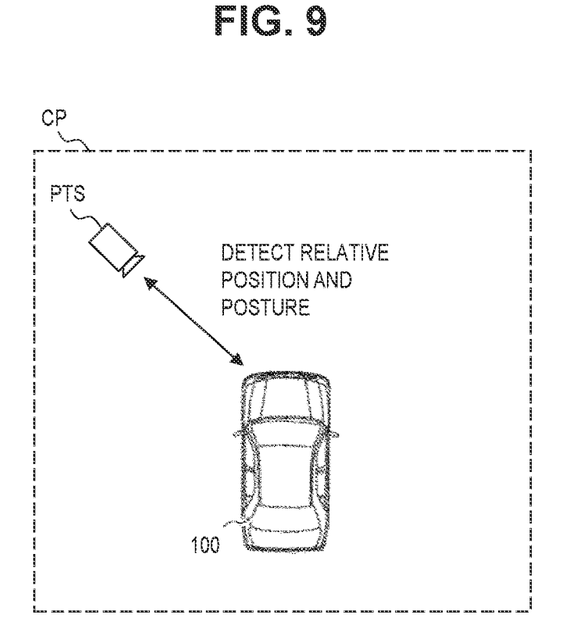
FIG. 9 is a conceptual diagram illustrating an example of a method of specifying a position of a vehicle by a position specifying device illustrated in FIG. 8.

FIG. 9 is a conceptual diagram illustrating one example of the method by which the position specifying device 200 specifies the position of the vehicle 100. In the example illustrated in FIG. 9, the position specifying external sensor PTS of the position specifying device 200 installed at the check point CP is illustrated. In this example, the position specifying map data PTD is given to include information on a position of the position specifying external sensor PTS on the map. Therefore, the position specifying external sensor PTS detects the relative position between the position specifying external sensor PTS and the vehicle 100, thereby specifying the position of the vehicle 100 on the map. Further, the position specifying external sensor PTS detects the posture of the vehicle 100 with respect to the position specifying external sensor PTS, thereby specifying the posture of the vehicle 100.

In other words, the position specifying processing unit PTU calculates the check information of the vehicle 100 based on the information on the position of the position specifying external sensor PTS on the map acquired from the position specifying map data PTD and the detection information on the position specifying external sensor PTS acquired from the position specifying external sensor PTS. In this case, examples of the position specifying external sensor PTS include a millimeter-wave radar, a sensor camera, LiDAR, or a combination thereof.

Here, the vehicle 100 may be configured such that it can be appropriately detected by the position specifying external sensor PTS. For example, when the position specifying external sensor PTS includes the millimeter-wave radar, the vehicle 100 may include the optical reflector.

Figure 10:
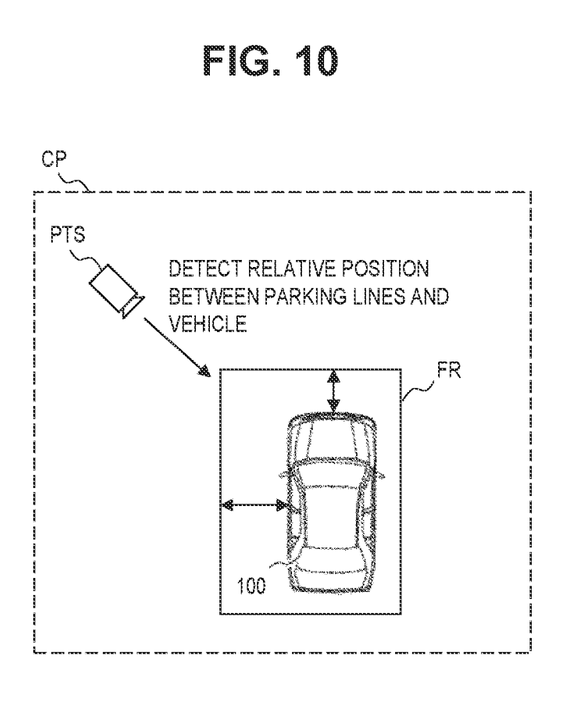
FIG. 10 is a conceptual diagram illustrating another example of the method of specifying the position of the vehicle by the position specifying device illustrated in FIG. 8.

FIG. 10 is a conceptual diagram illustrating another example of the method by which the position specifying device 200 specifies the position of the vehicle 100. In the example illustrated in FIG. 10, the position specifying external sensor PTS of the position specifying device 200 installed at the check point CP is illustrated. Further, the parking lines FR that define the parking place of the vehicle 100 are marked at the check point CP. In this example, the position specifying map data PTD is given to include information on a position of the parking lines FR on the map. Therefore, the position specifying external sensor PTS detects the relative position between the parking lines FR and the vehicle 100, thereby specifying the position of the vehicle 100.

In other words, the position specifying processing unit PTU calculates the check information of the vehicle 100 based on the information on the position of the parking lines FR on the map acquired from the position specifying map data PTD and information on the relative position between the parking lines FR and the vehicle 100 acquired from the position specifying external sensor PTS. In this case, examples of the position specifying external sensor PTS include a millimeter-wave radar, a sensor camera, LiDAR, or a combination thereof.

As above, the examples of the method by which the position specifying device 200 specifies the position of the vehicle 100 have been described, but the position specifying device 200 may specify the position of the vehicle 100 using other methods.

2-3. Self-Position Estimation System

The self-position estimation accuracy verification method executed by the vehicle system 10 according to the second embodiment is the same as that described with reference to FIGS. 6 and 7 in the first embodiment. However, in the vehicle system 10 according to the second embodiment, the first check information and the second check information described in steps S110 and S140 of the flowchart illustrated in FIG. 7 is calculated by the position specifying device 200.

3. Effect

As described above, according to the self-position estimation accuracy verification method and the self-position estimation system LCS of the present embodiment, the self-position estimation is started using the first check information as the initial value while the vehicle 100 is positioned at the first check point CP1. Then, after the vehicle 100 is moved to the second check point while the self-position estimation processing unit LCU continues the self-position estimation, the self-position estimation processing unit LCU verifies the accuracy of the self-position estimation based on the deviation between the estimation accuracy verification information and the second check information.

As such, the initial value of the self-position estimation is given by the position and the posture (the first check information) of the vehicle 100 specified at any of the check points CP on the map, and thus it is possible to guarantee the accuracy of the initial values of the self-position estimation and to appropriately verify the accuracy of the self-position estimation.

Further, when the deviation is equal to or higher than the predetermined threshold value k, the accuracy of the self-position estimation is repeatedly verified, and when the number of times of repetition is equal to or higher than the predetermined number of times N, it is determined that the accuracy of the self-position estimation is lowered. As such, it is possible to reduce a determination error due to the stochastic fluctuations of the result of the self-position estimation.

In the present embodiment, the self-position estimation accuracy verification method and the self-position estimation system LCS have been described using the vehicle 100 as a target, but the same advantageous effect can be obtained by suitably employing them to other mobile objects.

What is claimed is:

1. A self-position estimation accuracy verification method of verifying accuracy of self-position estimation that estimates a position and a posture of a mobile object on a map, a check point being a point at which the position and the posture of the mobile object on the map is specifiable by a self-position estimation system comprising at least one processor and a position specifying device, the position specifying device is an external device, when the mobile object is positioned, and a first check point and a second check point being any two check points that are different from each other from among a plurality of check points, the position specifying device being installed at each of the check points, the self-position estimation accuracy verification method comprising:

an initial step of moving the mobile object to the first check point;

a step of specifying a position and a posture of the mobile object positioned at the first check point on the map and acquiring first check information indicating specified information;

a step of starting the self-position estimation using the first check information as an initial value;

a step of moving the mobile object to the second check point while continuing the self-position estimation;

a step of specifying a position and a posture of the mobile object positioned at the second check point on the map and acquiring second check information indicating the specified information; and a verification step of calculating a deviation between a position and a posture of the mobile object on the map estimated by the self-position estimation at the second check point and the position and the posture of the mobile object on the map indicated in the second check information, and verifying the accuracy of the self-position estimation based on the deviation.

2. The self-position estimation accuracy verification method according to claim 1, further comprising:

in the verification step, when the deviation is equal to or higher than a predetermined threshold value, for sets of the first check point and the second check point, which are the same or different from each other, returning to the initial step and repeating each of the steps, wherein when the deviation is equal to or higher than the predetermined threshold value and repetition is executed for the number of times equal to or higher than a predetermined number of times, the accuracy of the self-position estimation is determined to be lowered.

3. The self-position estimation accuracy verification method according to claim 1, wherein, in the verification step, when the deviation is lower than a predetermined threshold value, the accuracy of the self-position estimation is determined to be normal.

4. A self-position estimation system which executes self-position estimation that estimates a position and a posture of a mobile object on a map, the self-position estimation system comprising:

at least one processor configured to execute:

a position specifying process for specifying the position and the posture of the mobile object on the map when the mobile object is positioned at any of a plurality of check points;

a self-position estimation process for executing the self-position estimation using the position and the posture of the mobile object on the map specified in the position specifying process as initial values; and an estimation accuracy verification process for verifying accuracy of the self-position estimation in the self-position estimation process, wherein:

a first check point and a second check point are any two check points that are different from each other from among the plurality of check points;

first check information is information on the position and the posture of the mobile object on the map specified in the position specifying process when the mobile object is positioned at the first check point;

second check information is information on the position and the posture of the mobile object on the map specified in the position specifying process when the mobile object is positioned at the second check point;

estimation accuracy verification information is information on a position and a posture of the mobile object on the map estimated in the self-position estimation process when the mobile object is moved to the second check point after the self-position estimation is started using the first check information as the initial value in the self-position estimation process when the mobile object is positioned at the first check point;

in the estimation accuracy verification process, the at least one processor is configured to calculate a deviation between the position and the posture of the mobile object on the map indicated by the estimation accuracy verification information and the position and the posture of the mobile object indicated by the second check information on the map, and to verify the accuracy of the self-position estimation based on the deviation; and the self-position estimation system further comprising a position specifying device, the position specifying device is an external device configured to specify the position and the posture of the mobile object, the position specifying device is installed at each of the check points.

5. The self-position estimation system according to claim 4, wherein:

the estimation accuracy verification information and the second check information are sequentially given for each of a plurality of the same or different sets of the first check point and the second check point;

in the estimation accuracy verification process, the at least one processor is configured to:

sequentially determine, for the sequentially given estimation accuracy verification information and second check information, whether the deviation is lower than, or equal to or higher than a predetermined threshold value; and determine, upon determining that the deviation is equal to or higher than the threshold value for the number of times equal to or higher than a predetermined number of times, that the accuracy of the self-position estimation is lowered.

6. The self-position estimation system according to claim 4, wherein, in the estimation accuracy verification process, the at least one processor is configured to determine, upon determining that the deviation is lower than a predetermined threshold value, that the accuracy of the self-position estimation is normal.

7. The self-position estimation system according to claim 4, wherein:

the external device includes a position specifying external sensor; and the position specifying external sensor is a sensor configured to detect information for specifying the position and the posture of the mobile object on the map.

* * * * *